United States Patent
Streuer et al.

(10) Patent No.: US 8,431,268 B2
(45) Date of Patent: Apr. 30, 2013

(54) BATTERY AND BATTERY CELL CONNECTING ELEMENT

(75) Inventors: Peter Streuer, Hannover (DE); Ingo Koch, Hamein (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 704 days.

(21) Appl. No.: 12/529,931

(22) PCT Filed: Mar. 3, 2008

(86) PCT No.: PCT/DE2008/000372
§ 371 (c)(1),
(2), (4) Date: Feb. 17, 2010

(87) PCT Pub. No.: WO2008/106945
PCT Pub. Date: Sep. 12, 2008

(65) Prior Publication Data
US 2010/0183921 A1    Jul. 22, 2010

(30) Foreign Application Priority Data

Mar. 7, 2007 (DE) .......................... 10 2007 011 390

(51) Int. Cl.
*H01M 2/24* (2006.01)
*H01M 2/28* (2006.01)

(52) U.S. Cl.
USPC .......................................... 429/161; 429/160

(58) Field of Classification Search .................. None
See application file for complete search history.

(56) References Cited

U.S. PATENT DOCUMENTS 5,308,719 A * 5/1994 Mrotek et al. ................ 429/160
5,424,148 A * 6/1995 Mrotek et al. ................ 429/158

FOREIGN PATENT DOCUMENTS

| DE | 24 47 639 | 10/1974 |
| DE | 10323529 | 8/2004 |
| EP | 1691431 | 8/2006 |
| JP | 02-094254 | * 4/1990 |
| JP | 8-031401 | * 2/1996 |
| JP | 08130030 | 5/1996 |
| WO | WO 01/06590 | 1/2001 |

OTHER PUBLICATIONS

Human translation of JP 02-094254, Apr. 1990.*

* cited by examiner

*Primary Examiner* — Jonathan Crepeau
(74) *Attorney, Agent, or Firm* — Boardman & Clark LLP

(57) ABSTRACT

The invention relates to a battery, comprising at least one battery cell connecting element (20), which is conductively connected to (a) a connector (28) having a cuboid-like base shape for connecting the same to at least one pole flange on a base (32) of the connector (28), and (b) a welded bracket (30), which is conductively connected to the connector (28), (c) wherein in the installed position of the battery (10) the connector (28) is disposed substantially horizontally, and the welded bracket (30) is disposed substantially vertically, and (d) wherein the connector (28) has a top (34) positioned opposite the base (32) and (e) at least one longitudinal side (36) adjoining the base (32), the welded bracket (30) being connected to the connector (28) on said side. The invention provides that the welded bracket (30) is electrically connected to the connector (28) via at least one contact element (44.1, 44.2) laterally disposed on the welded bracket (30) and leading onto the surface of the connector (28).

19 Claims, 5 Drawing Sheets

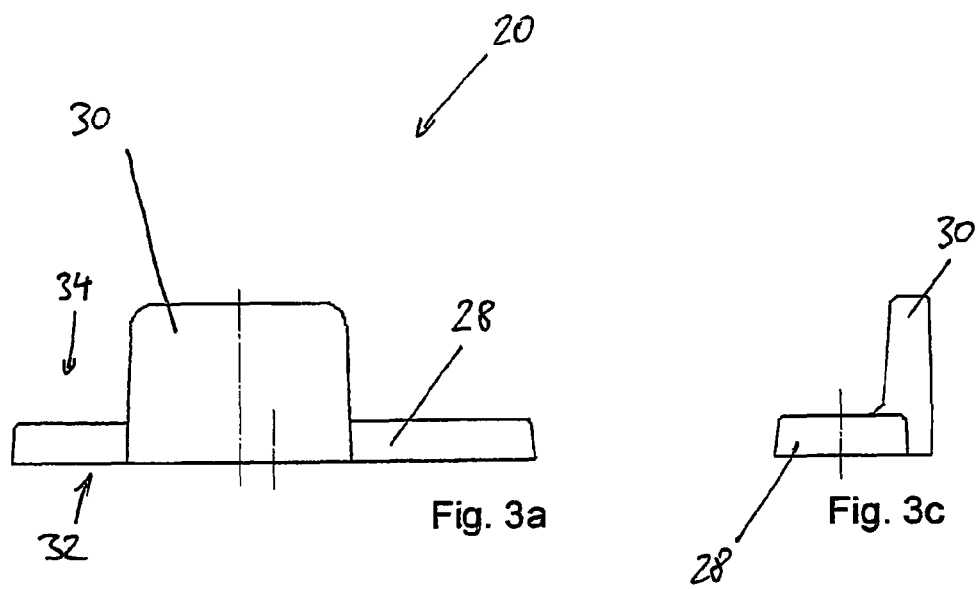
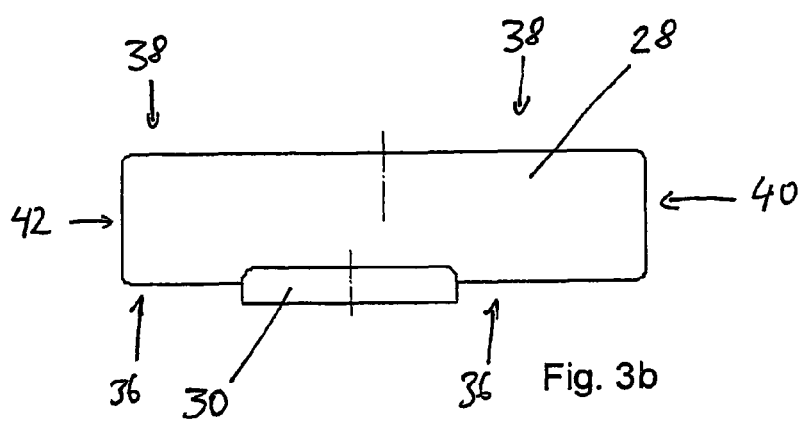

BATTERY AND BATTERY CELL CONNECTING ELEMENT

The invention relates to a battery having at least one battery cell connecting element which has (a) a connector which has a cuboid basic shape for connection to at least one plate, in particular to a pole plate set, on a lower face of the connector, and (b) a welding lug which is electrically conductively connected to a connector, (c) wherein, when the battery is in the installed position, the connector runs essentially horizontally and the welding lug runs essentially vertically, and (d) wherein the connector has an upper face opposite the lower face, and (e) at least one longitudinal face which is adjacent to the lower face and on which the welding lug is connected to the connector.

By way of example, a battery such as this is disclosed in DE 103 23 529 B3 or in DE 24 47 639.

Batteries such as these in the form of lead-acid rechargeable batteries are used, for example, as a starter battery in an automobile. A battery such as this comprises a plurality of galvanic cells which are connected in series and are separated from one another by an electrically insulating partition wall. Each of the galvanic cells comprises a positive and a negative plate set which are each formed from a plurality of pole plates. A battery cell connecting element electrically and mechanically connects the pole plates of one plate set to one another and it is additionally used to make electrical contact between the plate set of one galvanic cell via a further battery cell connecting element to another plate set in another galvanic cell, through the partition wall. A connecting element for connection of cells to form rechargeable batteries is known from EP 1 691 431 A1.

In order to allow an electrical contact such as this, the battery connecting elements are aligned relative to one another and relative to a recess in the partition wall, during manufacture of the batteries. The welding lugs of two battery cell connecting elements which are arranged on both sides of the partition wall are then welded to one another, and are therefore electrically connected to one another.

In the case of lead-acid rechargeable batteries, the connector is generally composed entirely of lead, which has a relatively poor electrical conductivity for a metal. Lead-acid rechargeable batteries generally have voltages of only between 6 volts and 48 volts. In modern motor vehicles such as commercial motor vehicles, however, high powers up to several kilowatts are required, as a result of which large currents flow through the battery cell connecting elements when on load. Because of the internal resistance of the battery, currents such as these lead to undesirable heating, which is disadvantageous. Furthermore, the internal resistance of the battery disadvantageously limits the maximum power which can be emitted from the battery.

The invention is based on the object of providing a battery with a reduced internal resistance.

The invention solves the problem by a battery of this generic type in which the welding lug is electrically connected to the connector via at least one contact element, which is arranged laterally on the welding lug and leads to the surface of the connector.

A battery having a battery cell connecting element such as this advantageously means that an electric current which flows from the pole plates via the battery cell connecting element is subject to less electrical resistance than if the battery cell connecting element were to be produced with the same amount of material but without the contact element. The material of the battery cell connecting element which is available to electrically carry the current is optimally used for the current flow by means of the contact element, thus making it possible to reduce the internal resistance at the battery. This reduces the undesirable heating of the battery during operation, and allows the battery to emit more power.

If a maximum acceptable internal resistance has been specified, then the invention alternatively makes it possible to save material for the production of the battery cell connecting element, for example lead.

Another advantage is that the invention can be implemented with little effort. All that is necessary is to replace the molds which are used to cast the battery cell connecting elements.

For the purposes of the present invention, a cuboid basic shape means that it is possible, but not necessary, for the connector to be cuboid in the strict mathematical sense. In fact, it is possible for the connector to differ from the cuboid shape, for example by having more than six surfaces, with two opposite faces not running parallel to one another, or with mutually adjacent surfaces running at an angle that is not a right angle with respect to one another. Such modifications are known from the prior art.

The feature that the connector runs essentially horizontally means that it is possible but not necessary for the connector to run strictly horizontally. In particular, it is sufficient for the connector to run at an angle of less than 10° to the horizontal. A corresponding situation applies to the feature that the welding lug runs essentially vertically. In this case as well, discrepancies of, for example, less than 10° from the vertical are considered to be essentially vertical.

In one preferred embodiment, the battery is a lead-acid rechargeable battery, in particular a commercial motor vehicle lead-acid rechargeable battery. Commercial motor vehicle lead-acid rechargeable batteries differ from automobile or motorcycle lead-acid rechargeable batteries, for example, in that the welding lug is arranged centrally on the longitudinal face of the connector.

It is preferable for the welding lug to have two contact elements which are arranged on both sides laterally on the welding lug, lead to the surface of the connector, and electrically connect the welding lug to the connector. In this case, by way of example, the contact elements are designed with mirror-image symmetry with respect to one another, as a result of which the battery cell connecting element is likewise designed with mirror-image symmetry with respect to a mirror plane.

As the distance from the upper face of the connector increases, the current density during charging and discharging of the batteries decreases, for which reason provision is preferably made for the contact element to have a cross section which increases as the distance from the upper face of the connector decreases. It is also advantageous for the battery cell connecting element to be removable from the casting mold particularly easily.

Since an electric current which originates from a pole plate which is connected to the connector at an outer end of the connector has to overcome a particularly high electrical resistance, one preferred embodiment provides that the contact element has a cross section which increases as the distance from the welding lug increases. This reduces the electrical resistance which the current has to overcome from a pole plate located at the side.

It is preferable for the contact element to have a connector-side transitional area in which it merges into the connector, with the connector-side transitional area having a lateral section, and with the lateral section having a lateral radius of curvature which is between 3 mm and 10 mm.

It has been found that this makes it possible to achieve a particularly low battery internal resistance. In this case, the adjective "lateral" relates to the battery cell connecting element and means facing away from the welding lug.

Furthermore, the contact element advantageously has a medial section, which has a medial radius of curvature which is between 1 mm and 3 mm. It advantageously has a radius of curvature of between 0.25 mm and 2 mm in a transitional area on the welding lug side, in which the contact element merges into the welding lug.

In order to simplify manufacture, the battery cell connecting element is preferably formed integrally, in particular by being cast from lead. The battery cell connecting element has a particularly low internal resistance if a contact element cross section of the contact element projected onto the upper face has a side line which runs at an angle of 30° to 60° to the longitudinal axis of the connector. It is advantageous if the contact element cross section is essentially triangular, with a further face of the contact element cross section running essentially parallel to the longitudinal face of the connector. The angle between the two long faces of the contact element cross section, which has its apex point within the welding lug, is then likewise 30° to 60°.

Material can be saved if, where the contact element merges into the connector, the contact element cross section has a contact element cross-sectional area which is smaller than a horizontal cross section of the welding lug at the same level. The cross section of the welding lug is therefore greater than that of the contact element at each horizontal level. In this case, the size of the cross section means the cross-sectional area. It is particularly advantageous for the contact element cross section to be less than half the cross section of the welding lug at the same horizontal level.

The fitting of the battery cell connecting element is particularly simplified if, on the connector side, the contact element is arranged essentially completely beyond a horizontal plane which runs through the longitudinal face on which the welding lug is connected to the connector.

One embodiment of the invention will be explained in more detail in the following text with reference to the drawings, in which:

FIGS. 3a, 3b, 3c show cross-sectional views of battery cell connecting elements according to the prior art.

Figure 1:
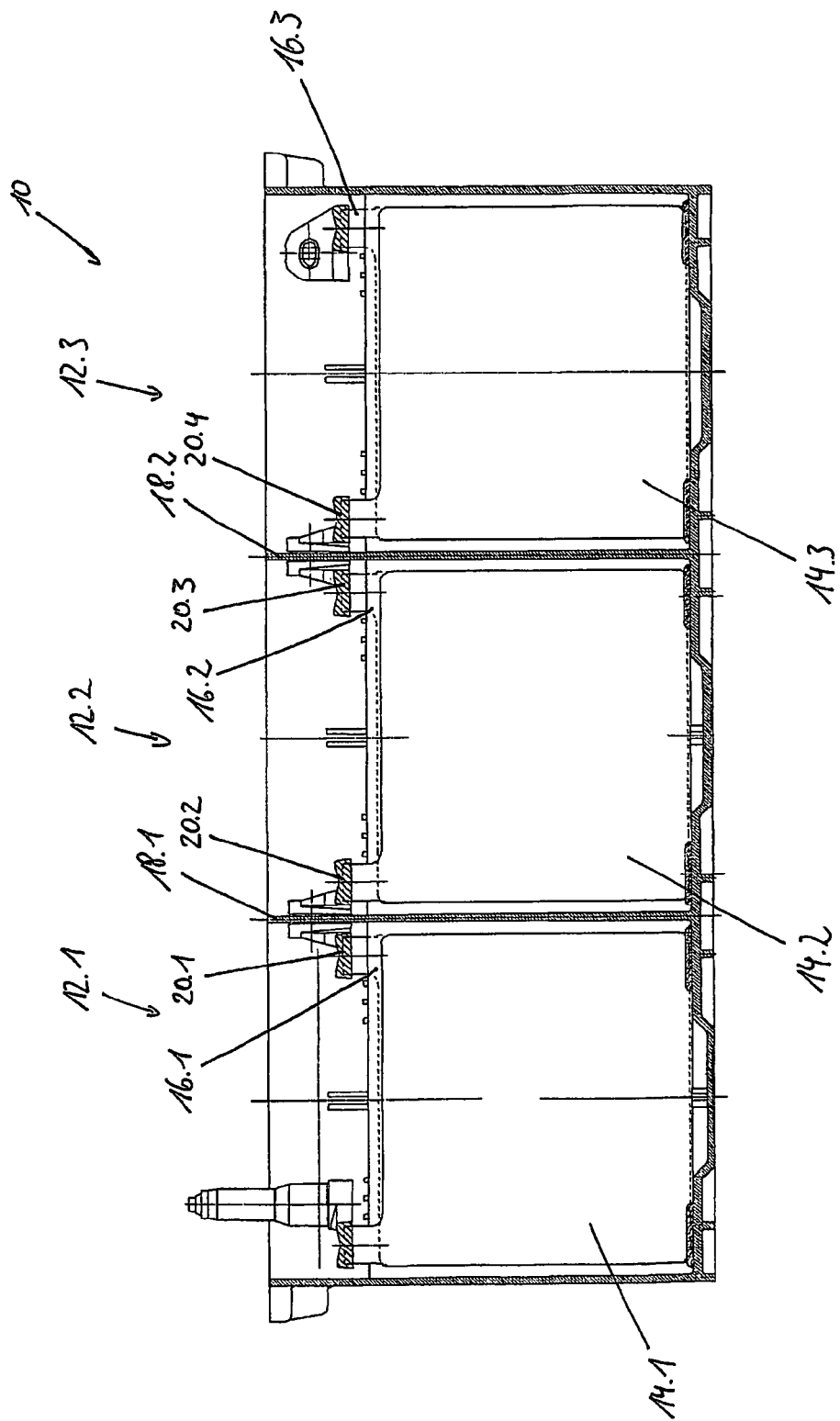
FIG. 1 shows a cross section through a battery according to the invention.

FIG. 1 shows a cross-sectional view of a battery 10 which comprises galvanic cells 12.1 to 12.6, of which the galvanic cells 12.1, 12.2 and 12.3 are illustrated in FIG. 1. The galvanic cells 12.1, 12.2, 12.3 each comprise a positive plate set 14.1, 14.2, 14.3 and a negative plate set 16.1, 16.2 and 16.3. The galvanic cells 12.1 to 12.3 are physically and electrically separated from one another by partition walls 18.1, 18.2, and are arranged in a housing.

Each of the plate sets 14.1 to 14.3 and 16.1 to 16.3 comprises a plurality of pole plates, which are mechanically and electrically connected to a battery cell connecting element 20.1, 20.2, 20.3 and 20.4. Two battery cell connecting elements 20.1 and 20.2, as well as 20.3 and 20.4, are in each case electrically and mechanically connected to one another through an opening, which is not shown, in the respective partition wall 18.1 or 18.2, as a result of which the galvanic cells 12.1 to 12.3 are connected in series.

Figure 2:
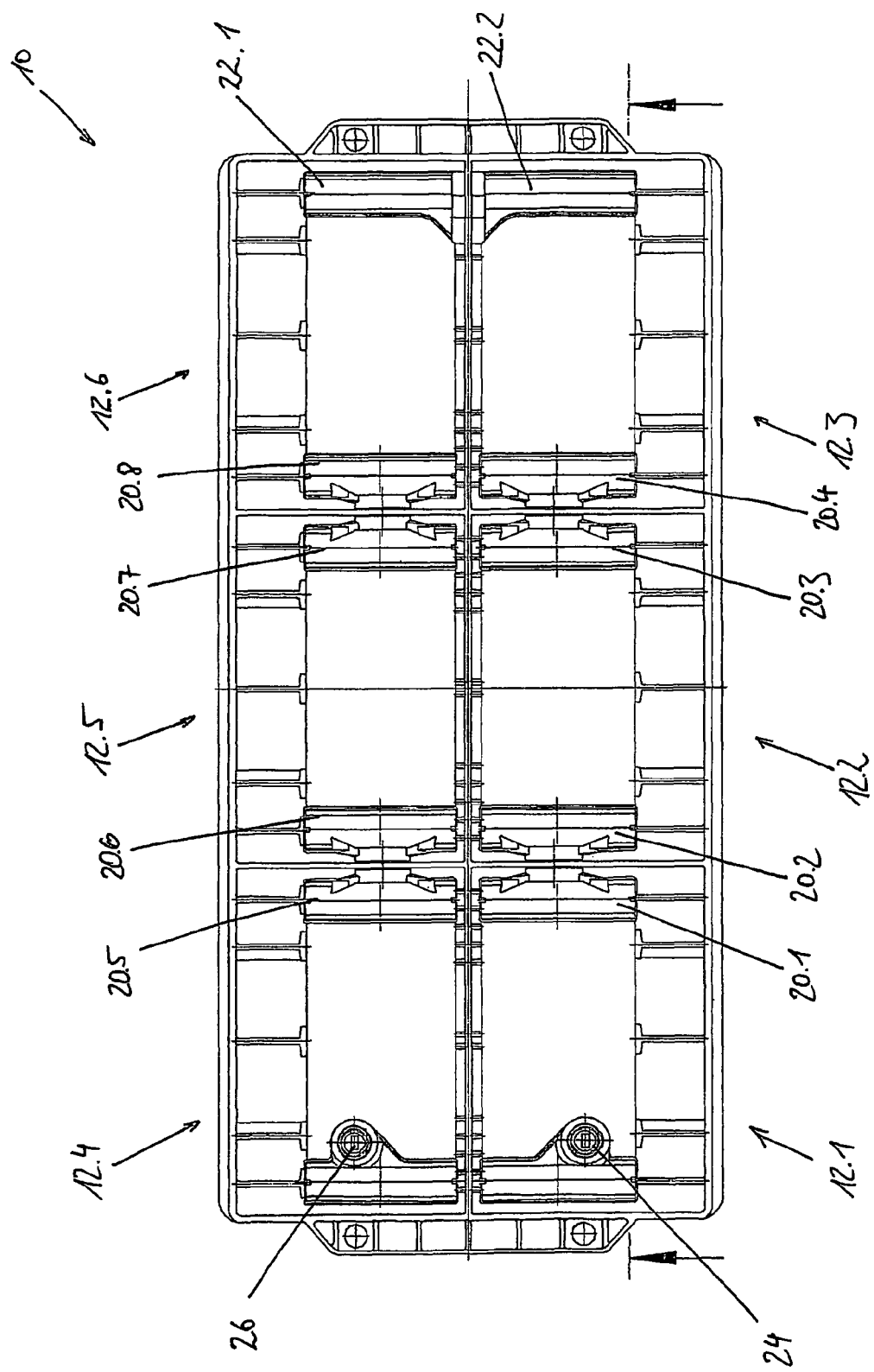
FIG. 2 shows a plan view of the batteries shown in FIG. 1.

In addition to the galvanic cells 12.1 to 12.3, FIG. 2 shows three further galvanic cells 12.4, 12.5 and 12.6, which are electrically and mechanically connected to the galvanic cells 12.1 to 12.3 via two battery cell connecting elements 22.1, 22.2, and are connected in series. When an electric current is applied to a positive pole 24 and to a negative pole 26, or an electric current is tapped off from them, then the electric current flows through all the galvanic cells 12.1 to 12.6, and in the process passes through the battery cell connecting elements 20.1 to 20.8 and 22.1, 22.2. Since the electric current must pass through a multiplicity of battery cell connecting elements, even minor improvements with regard to the electrical resistance which these battery cell connecting elements have will lead to a relative reduction in the total internal resistance of the battery 10.

FIG. 3a shows a battery cell connecting element 20 which has a connector 28 and a welding lug 30. The connector 28 has an essentially cuboid basic shape with a lower face 32, an upper face 34, a longitudinal face 36 on the welding lug side (FIG. 3b), a longitudinal face 38 averted from the welding lug, a first lateral longitudinal face 40 and a second lateral longitudinal face 42. The welding lug 30 is arranged on the longitudinal face 36 of the connector 28 on the welding lug side.

Figure 4:
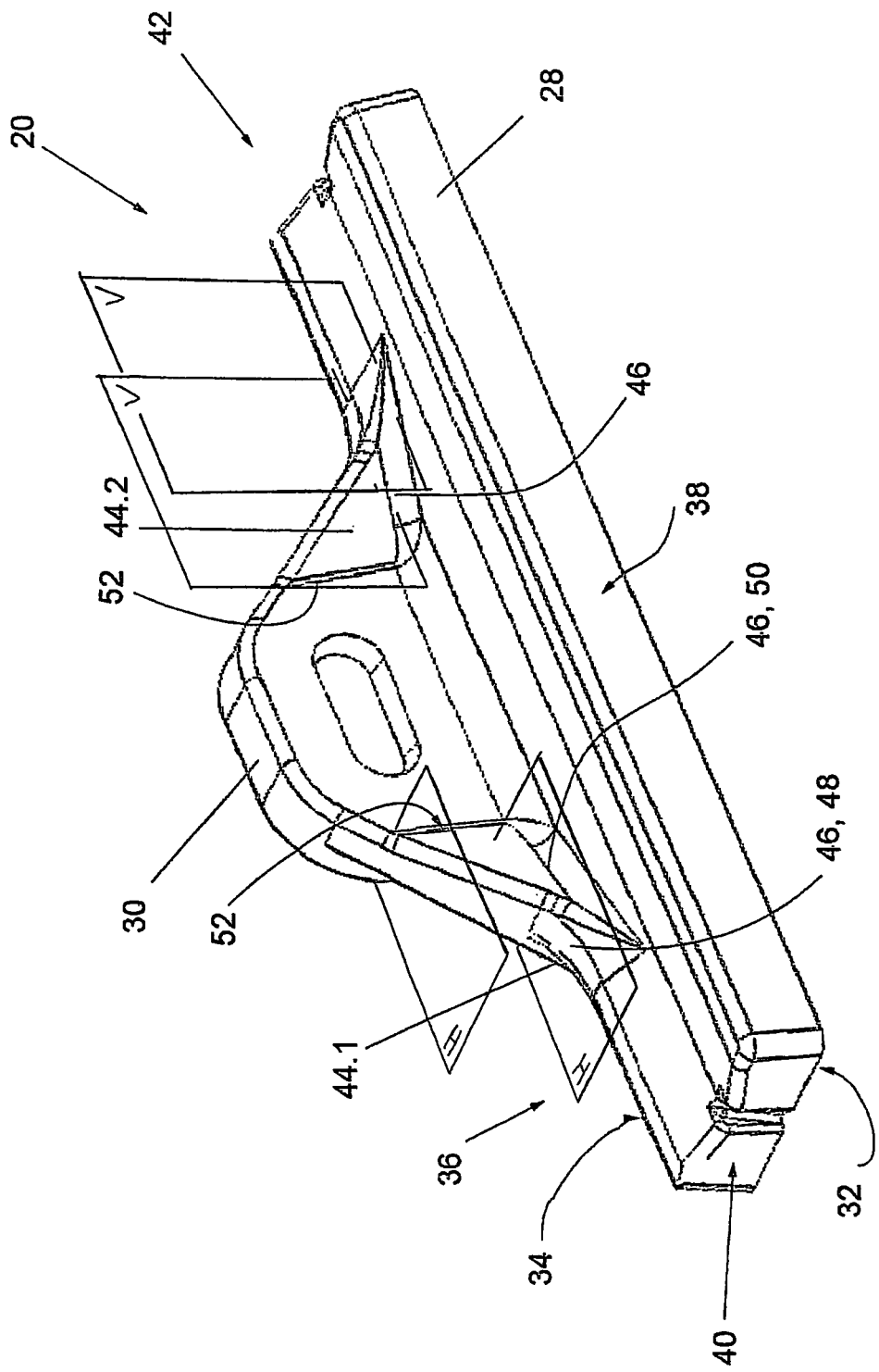
FIG. 4 shows a battery cell connecting element for a battery according to the invention.

FIG. 4 shows a perspective view of the battery cell connecting element 20 for a battery according to the invention, in which identical objects are provided with the same reference symbols. The battery cell connecting element 20 comprises a first contact elements 44.1 and a second contact element 44.2. The two contact elements 44.1, 44.2 are integrally connected both to the welding lug 30 and to the connector 28, and run in a wedge shape, tapering towards the welding lug 30.

The two contact elements 44.1, 44.2 have horizontal cross sections with respect to a horizontal H whose area increases as the distance from the upper face 34 decreases. In other words, the contact element 44.1, 44.2 taper upward. The "upward" direction always relates, in the same way as the other orientation details in the present description, to an installation position of the battery cell connecting element 20 in a battery 10 as is shown in FIGS. 1 and 2. These orientation details should not, however, be considered to be restrictive but are intended only to illustrate one particularly suitable arrangement.

Figure 5A:
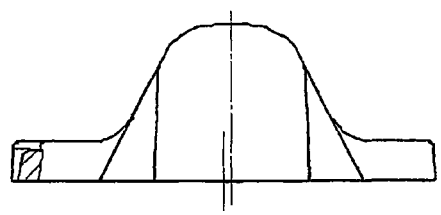
FIGS. 5a, 5b, 5c, 5d show cross-sectional views of a battery cell connecting element of a battery according to the invention.
Figure 5B:
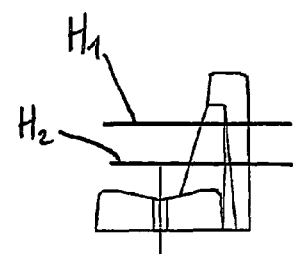
Figure 5C:
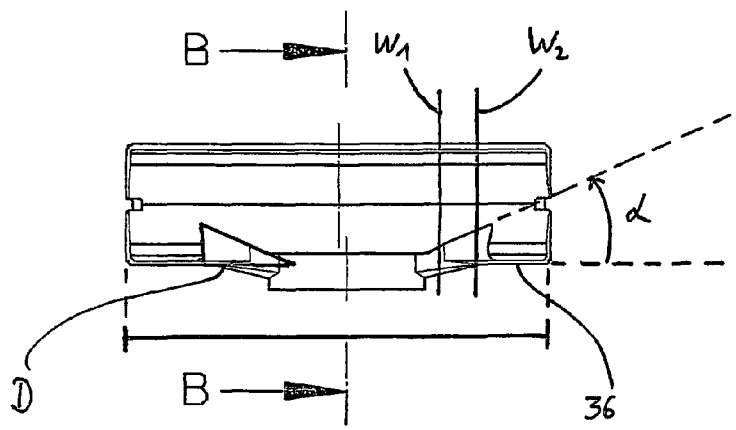
Figure 5D:
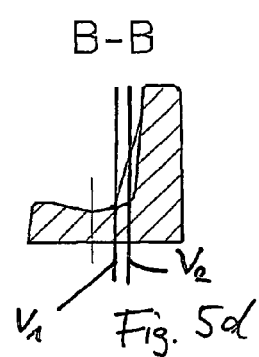

In addition, the contact elements 44.1, 44.2 are designed such that sections with a vertical plane V running along the longitudinal face 36 on the welding lug side have an area which decreases as the distance from the longitudinal face 36 on the welding lug side increases. Furthermore, the contact elements 44.1, 44.2 are designed such that a section with a vertical plane W (FIG. 5c) running at right angles to the longitudinal face 36 on the welding lug side has a cross section which increases as the distance from the welding lug 30 increases. The contact elements 44.1, 44.2 therefore have a prismatic basic structure, whose base area is essentially triangular, as is indicated by the triangle D in FIG. 5c. The opening angle α between the two longest limbs is between 30° and 60°, with one of the limbs running parallel to the longitudinal face 36 on the welding lug side.

FIG. 4 shows a connector-side transitional area 46, which has a lateral section 48 and a medial section 50. In the lateral section 48, the transitional area has a lateral radius of curvature of 3 mm to 10 mm, and in the medial section 50 the medial radius of curvature is 2 mm. The radius of curvature in a transitional area 52 on the welding lug side is likewise 2 mm.

The battery cell connecting element 20 is produced by casting lead in a suitably shaped mold. In order to allow the resultant battery cell connecting element to be removed from the mold easily, the welding lug 30, the connector 28 and the contact elements 44.1, 44.2 run conically upward and, with their corresponding surfaces in this case form an angle of 2° to 7° relative to a corresponding vertical plane.

Reference Symbols
10 Battery
12.1, . . . , 12.6 galvanic cell
14.1, 14.2, 14.3 positive plate set
16.1, 16.2, 16.3 negative plate set
18.1, 18.2 partition wall
20.1, 20.2, . . . , 20.8
22.1, 22.2 battery cell connecting element
24 positive pole
26 negative pole
28 connector
30 welding lug
32 lower face
34 upper face
36 longitudinal face on the welding lug side
38 longitudinal side averted from the welding lug
40 first lateral longitudinal face
42 second lateral longitudinal face
44.1, 44.2 contact element
46 connector-side transitional area
48 lateral section
50 medial section
52 transitional area on the welding lug side
V vertical plane
H horizontal plane
S side line
α opening angle

The invention claimed is:

1. A battery having at least one battery cell connecting element (20) which has
   (a) a connector (28) which has a cuboid basic shape for connection to at least one pole plate on a lower face (32) of the connector (28), and
   (b) a welding lug (30) which is electrically conductively connected to the connector (28),
   (c) wherein, when the battery (10) is in the installed position, the connector (28) is arranged essentially horizontally and the welding lug (30) is arranged essentially vertically, and
   (d) wherein the connector (28) has an upper face (34) opposite the lower face (32), and
   (e) at least one longitudinal face (36) which is adjacent to the lower face (32) and on which the welding lug (30) is connected to the connector (28), characterized in that
   (f) the welding lug (30) is electrically connected to the connector (28) via at least one contact element (44.1, 44.2), which is arranged laterally on the welding lug (30) and leads to a surface of the connector (28), and the welding lug extends substantially over its entire length along the longitudinal face (36) to which the welding lug is connected, wherein the welding lug (30) is electrically connected to the connector via two contact elements (44.1, 44.2), which are arranged laterally on the welding lug (30) and lead to the surface of the connector (28).

2. The battery as claimed in claim 1, characterized in that the battery is a motor vehicle lead-acid rechargeable battery.

3. The battery as claimed in claim 1, characterized in that the contact element (44.1, 44.2) has a cross section which increases as the distance from the upper face (34) of the connector (28) decreases.

4. The battery as claimed in claim 1, characterized in that the contact element (44) has a cross section which increases as the distance from the welding lug (30) increases.

5. The battery as claimed in claim 1, characterized in that the battery cell connecting element (20) is formed integrally.

6. The battery as claimed in claim 5, characterized in that the battery cell connecting element (20) is a casting.

7. The battery as claimed in claim 6, characterized in that the casting is composed of lead.

8. The battery as claimed in claim 1, characterized in that, on the connector side, the contact element (44.1, 44.2) is arranged essentially beyond a horizontal plane which runs through the longitudinal face (36) on which the welding lug (30) is connected to the connector (28).

9. The battery as claimed in claim 1, characterized in that the battery is a lead-acid rechargeable battery (10).

10. A battery having at least one battery cell connecting element (20) which has
    (a) a connector (28) which has a cuboid basic shape for connection to at least one pole plate on a lower face (32) of the connector (28), and
    (b) a welding lug (30) which is electrically conductively connected to the connector (28),
    (c) wherein, when the battery (10) is in the installed position, the connector (28) is arranged essentially horizontally and the welding lug (30) is arranged essentially vertically, and
    (d) wherein the connector (28) has an upper face (34) opposite the lower face (32), and
    (e) at least one longitudinal face (36) which is adjacent to the lower face (32) and on which the welding lug (30) is connected to the connector (28), characterized in that
    (f) the welding lug (30) is electrically connected to the connector (28) via at least one contact element (44.1, 44.2), which is arranged laterally on the welding lug (30) and leads to a surface of the connector (28), and the welding lug extends substantially over its entire length along the longitudinal face (36) to which the welding lug is connected,
    characterized in that
    the contact element (44) has a connector-side transitional area (46) in which it merges into the connector (38),
    the connector-side transitional area (46) has a lateral section (48), and
    the lateral section (48) has a lateral radius of curvature which is between 3 mm and 10 mm.

11. A battery having at least one battery cell connecting element (20) which has
    (a) a connector (28) which has a cuboid basic shape for connection to at least one pole plate on a lower face (32) of the connector (28), and
    (b) a welding lug (30) which is electrically conductively connected to the connector (28),
    (c) wherein, when the battery (10) is in the installed position, the connector (28) is arranged essentially horizontally and the welding lug (30) is arranged essentially vertically, and
    (d) wherein the connector (28) has an upper face (34) opposite the lower face (32), and
    (e) at least one longitudinal face (36) which is adjacent to the lower face (32) and on which the welding lug (30) is connected to the connector (28), characterized in that
    (f) the welding lug (30) is electrically connected to the connector (28) via at least one contact element (44.1, 44.2), which is arranged laterally on the welding lug (30) and leads to a surface of the connector (28), and the welding lug extends substantially over its entire length along the longitudinal face (36) to which the welding lug is connected, characterized in that the contact element (44) has a connector-side transitional area (46) in which it merges into the connector, the connector-side transitional area (46) has a medial section (50), and the medial section (50) has a medial radius of curvature which is between 1 mm and 3 mm.

12. A battery having at least one battery cell connecting element (20) which has
   (a) a connector (28) which has a cuboid basic shape for connection to at least one pole plate on a lower face (32) of the connector (28), and
   (b) a welding lug (30) which is electrically conductively connected to the connector (28),
   (c) wherein, when the battery (10) is in the installed position, the connector (28) is arranged essentially horizontally and the welding lug (30) is arranged essentially vertically, and
   (d) wherein the connector (28) has an upper face (34) opposite the lower face (32), and
   (e) at least one longitudinal face (36) which is adjacent to the lower face (32) and on which the welding lug (30) is connected to the connector (28), characterized in that
   (f) the welding lug (30) is electrically connected to the connector (28) via at least one contact element (44.1, 44.2), which is arranged laterally on the welding lug (30) and leads to a surface of the connector (28), and the welding lug extends substantially over its entire length along the longitudinal face (36) to which the welding lug is connected,
   characterized in that the contact element (44) has a radius of curvature which is between 0.25 mm and 2 mm in a transitional area (52) on the welding lug side, in which the contact element merges into the welding lug (30).

13. The battery as claimed in claim 12, characterized in that the contact element has a cross section which increases as the distance from the upper face of the connector decreases.

14. The battery as claimed in claim 12, characterized in that the contact element has a cross section which increases as the distance from the welding lug increases.

15. A battery having at least one battery cell connecting element (20) which has
   (a) a connector (28) which has a cuboid basic shape for connection to at least one pole plate on a lower face (32) of the connector (28), and
   (b) a welding lug (30) which is electrically conductively connected to the connector (28),
   (c) wherein, when the battery (10) is in the installed position, the connector (28) is arranged essentially horizontally and the welding lug (30) is arranged essentially vertically, and
   (d) wherein the connector (28) has an upper face (34) opposite the lower face (32), and
   (e) at least one longitudinal face (36) which is adjacent to the lower face (32) and on which the welding lug (30) is connected to the connector (28), characterized in that
   (f) the welding lug (30) is electrically connected to the connector (28) via at least one contact element (44.1, 44.2), which is arranged laterally on the welding lug (30) and leads to a surface of the connector (28), and the welding lug extends substantially over its entire length along the longitudinal face (36) to which the welding lug is connected,
   characterized in that a contact element cross section (D) of the contact element projected onto the upper face (34) has a side line (S) which runs at an angle ($\alpha$) of 30° to 60° to the longitudinal face (36) of the connector (28).

16. A battery having at least one battery cell connecting element (20) which has
   (a) a connector (28) which has a cuboid basic shape for connection to at least one pole plate on a lower face (32) of the connector (28), and
   (b) a welding lug (30) which is electrically conductively connected to the connector (28),
   (c) wherein, when the battery (10) is in the installed position, the connector (28) is arranged essentially horizontally and the welding lug (30) is arranged essentially vertically, and
   (d) wherein the connector (28) has an upper face (34) opposite the lower face (32), and
   (e) at least one longitudinal face (36) which is adjacent to the lower face (32) and on which the welding lug (30) is connected to the connector (28), characterized in that
   (f) the welding lug (30) is electrically connected to the connector (28) via at least one contact element (44.1, 44.2), which is arranged laterally on the welding lug (30) and leads to a surface of the connector (28), and the welding lug extends substantially over its entire length along the longitudinal face (36) to which the welding lug is connected,
   characterized in that the contact element cross section (D) is less than a horizontal cross section of the welding lug (30) where the contact element (44) merges into the connector (28).

17. The battery as claimed in claim 16, characterized in that the contact element has a cross section which increases as the distance from the upper face of the connector decreases.

18. The battery as claimed in claim 16, characterized in that the contact element has a cross section which increases as the distance from the welding lug increases.

19. A battery having at least one battery cell connecting element (20) which has
   (a) a connector (28) which has a cuboid basic shape for connection to at least one pole plate on a lower face (32) of the connector (28), and
   (b) a welding lug (30) which is electrically conductively connected to the connector (28),
   (c) wherein, when the battery (10) is in the installed position, the connector (28) is arranged essentially horizontally and the welding lug (30) is arranged essentially vertically, and
   (d) wherein the connector (28) has an upper face (34) opposite the lower face (32), and
   (e) at least one longitudinal face (36) which is adjacent to the lower face (32) and on which the welding lug (30) is connected to the connector (28), characterized in that
   (f) the welding lug (30) is electrically connected to the connector (28) via at least one contact element (44.1, 44.2), which is arranged laterally on the welding lug (30) and leads to a surface of the connector (28), and the welding lug extends substantially over its entire length along the longitudinal face (36) to which the welding lug is connected,
   characterized in that the welding lug (30) has a cross section which decreases as the distance from the connector (28) increases, such that mutually opposite side surfaces of the welding lugs (30) are at an angle of 2° to 10° to one another.

* * * * *